(12) United States Patent
Sudhakaran

(10) Patent No.: US 9,672,536 B2
(45) Date of Patent: Jun. 6, 2017

(54) CUSTOMIZED VCARDS

(71) Applicant: PAYPAL, INC., San Jose, CA (US)

(72) Inventor: Shibi Sudhakaran, Fremont, CA (US)

(73) Assignee: PAYPAL, INC., San Jose, CA (US)

(*) Notice: Subject to any disclaimer, the term of this patent is extended or adjusted under 35 U.S.C. 154(b) by 955 days.

(21) Appl. No.: 13/673,628

(22) Filed: Nov. 9, 2012

(65) Prior Publication Data

US 2014/0136319 A1 May 15, 2014

(51) Int. Cl.
*G06Q 30/02* (2012.01)
*G06Q 50/00* (2012.01)

(52) U.S. Cl.
CPC ..... *G06Q 30/0271* (2013.01); *G06Q 30/0257* (2013.01); *G06Q 30/0267* (2013.01); *G06Q 50/01* (2013.01)

(58) Field of Classification Search
CPC combination set(s) only.
See application file for complete search history.

(56) References Cited

U.S. PATENT DOCUMENTS

| 2013/0185322 A1* | 7/2013 | Vegh | 707/769 |
| 2014/0067702 A1* | 3/2014 | Rathod | 705/319 |
| 2014/0108289 A1* | 4/2014 | Eitan et al. | 705/342 |

* cited by examiner

*Primary Examiner* — Mark A Fleischer
(74) *Attorney, Agent, or Firm* — Haynes and Boone, LLP

(57) ABSTRACT

Methods and systems provide customized electronic cards, such as customized vCards. Each vCard can be customized, such as with respect to a particular recipient. Thus, desired specific information can be provided to the recipient and not provided to anyone else who receives a vCard from a user. In this manner, a unique communication between the user and the recipient can be defined. Different vCards, each containing some common information and some unique information, can be communicated to different recipients.

18 Claims, 4 Drawing Sheets

CUSTOMIZED VCARDS

BACKGROUND

Technical Field

The present disclosure generally relates to electronic communications and, more particularly, relates to methods and systems for providing customized vCards.

Related Art vCards are well known. vCards are electronic business cards that can readily be exchanged among people and viewed upon a computer, mobile telephone, or the like. Like their physical counterparts, vCards can contain a person's name, title, company name, telephone number, physical address, company web address, and email address. vCards can contain any desired type of information. The amount of information is not constrained to what can be printed on a paper card, as with their physical counterparts. Thus, vCards can, at least in theory, contain an indefinite amount of information. For example, a vCard can contain a company's entire product catalog, along with advertisements and new product announcements. A vCard can contain text, audio, and video.

A standard file format simplifies handling, storage, and use of vCards. vCards can easily be attached to e-mail, text messages, and other electronic communications. They can thus be exchanged via networks, such as the Internet. vCards can also be easily exchanged during personal visits, such as by using near field communication (NFC). For example, a vCard stored on a cellular telephone of one person can be communicated to a cellular telephone of another person by designating what is to be communicated, e.g., the vCard, on the cellular telephone with the vCard, then bringing the two cellular telephones into close proximity or tapping the two cellular telephones together to initiate NFC. The vCard and any other designated information will then be communicated from one cellular telephone to the other cellular telephone.

DETAILED DESCRIPTION

Figure 1:
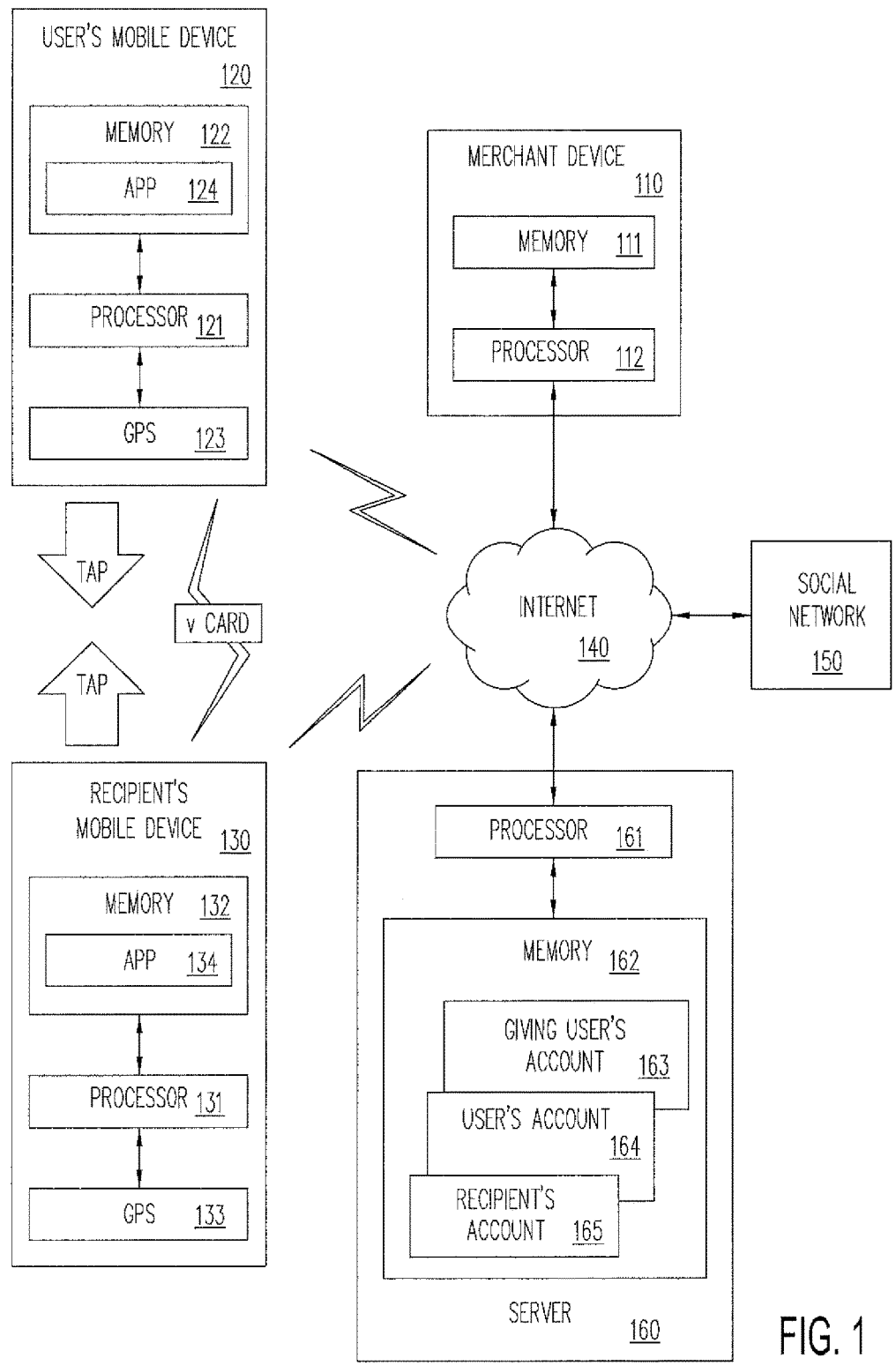
FIG. 1 is a block diagram of a system for providing customized vCards, according to an embodiment.

According to an embodiment, customized electronic cards (e.g., vCards) can be provided. Each vCard can be customized, such as with respect to a particular recipient (or a group of recipients). In this manner, desired specific information can be provided to the recipient (or a group of recipients) and not provided to anyone else who receives a vCard from a user. The vCard can be communicated either manually (such as by initiating near field communications (NFC)) or automatically (such as via a network) from a user's mobile device to a recipient's mobile device. In this manner, a unique communication between the user and the recipient (or a group of recipients) can be defined.

Different customized vCards can be communicated to different groups of recipients. Each of the different customized vCards can contain some common information and some unique information. Alternatively, each of the different customized vCards can contain only unique information (and thus lack any common information).

For example, the groups can be defined as friends, family members, business associates, existing clients, and prospective clients. Different customized vCards can be defined and a unique vCard can be communicated to selected members of such groups. That is, the same vCard can be sent to the selected members of one group and the selected members of each other group can receive different unique vCards. Thus, one unique vCard can be communicated to selected friends of the user, a different unique vCard can be communicated to selected family members of the user, yet a different unique vCard can be communicated to selected business associates of the user, and so on. In this manner, members of each group can receive information that is appropriate for and unique with respect to that group.

After a customized vCard has been communicated, the recipient can update or create a new contact. This can be done automatically, such as via the app. The app can be configured to require authorization of the user before updating or creating a new contact using the customized vCard.

The information provided by the customized vCard can be used to determine the existence of any shared attributes or characteristics of the user and the recipient. For example, the information can allow the user and the recipient to realize that they share interests, hobbies, connections, likes, and dislikes, for example. An app can flag any such shared attributes and alert the recipient regarding such shared attributes. Information regarding such shared attributes can be communicated, such as with the recipient's authorization, from the recipients device to the user's mobile device. Information regarding such shared attributes can be communicated, such as with the recipient's and/or the user's authorization, to a social network site of the user, to a social network site of the recipient, or to any other social network site. Information regarding such shared attributes can be communicated to any desired person, group of people, web site, or device.

One or more social network sites of the recipient can be accessed to determine interests of the recipient. The customized vCard can be tailored using information from the social network sites regarding interests of the recipient. For example, if the recipient is a Red Sox fan, the customized vCard can include, with the user's authorization, an invitation to the next local Red Sox game.

The customized vCard can be communicated electronically, such as via a network or via near field communication (NFC). The network can be a local area network (LAN) such as a business network, a wide area network (WAN) such as the Internet, a cellular telephone network, or any other type of network. The network can be a combination of different networks or different types of networks.

Near field communication (NFC) allows mobile devices such as cellular telephones to communicate with one another locally, without requiring the use of a network. Wireless, e.g., radio, communication can be established by, for example, touching two mobile devices together or bringing the two mobile devices close to one another. In this manner, information such as the customized vCard, can be communicated from one mobile device to the other mobile device.

The customized vCard can be communicated via a network, such as in an email, text message, NFC, or in any other manner. The customized vCard can be an attachment, such as to an email or a text message.

According to an embodiment, a system can comprise a mobile device and one or more memories associated with the mobile device. The one or more memories can store a standard electronic card, e.g. a vCard and can store customization information, e.g., vCard customization information. The vCard can be a basic vCard, such as a vCard containing basic information such as the user's name, title, company name, telephone number, physical address, company web address, and email address. Such basic information can be common to all vCards provided by the user. Such basic information can be modified, such as on a recipient-by-recipient or group-by-group basis.

One or more hardware processors can be operable to receive a signal indicative of an initiation of a near field communication process, access the one or more memories to obtain the vCard and the vCard customization information, combine the vCard with the vCard customization information to define a customized vCard, and communicate the customized vCard via the near field communication process.

The vCard customization information can include vCard customization information for a plurality of people, including a recipient. The near field communication process can be between a user and the recipient. The vCard can be combined with vCard customization information for the recipient.

The one or more memories can be memories of the mobile device. One of the one or more memories can be a memory of the mobile device and one of the one or more memories is not a memory of the mobile device. One of the one or more memories can be a memory of a server.

The one or more hardware processors can be further operable to receive the vCard customization information. The one or more hardware processors can be further operable to receive inputs from a user interface of the mobile device and the inputs can define the vCard customization information. The one or more hardware processors can be further operable to receive the vCard customization information from a network. The one or more hardware processors can be further operable to receive the vCard customization information from a social network.

The mobile device can be a cellular telephone. The mobile device can be a portable computational device. The mobile device can be any portable electronic device suitable for making and communicating the customized vCard. A non-mobile device, such as a desktop computer or server, can be used to make and communicate the customized vCard.

The one or more hardware processors can be further operable to determine a type of the recipient, obtain vCard customization information associated with the type of the recipient, and combine the vCard with the vCard customization information associated with the type of the recipient to define a customized vCard. The customization information can be stored on the user's mobile device, for example. The type of the recipient can be determined from information provided by the user, from information obtained from a social networking site, from information obtained from the Internet, from information obtained from an online seller, from information obtained from a payment provided, or in any other manner. The user can explicitly define the type of the user. For example, the user can explicitly define the type of the user as friend, family member, co-worker, customer, prospective customer, and the like.

The one or more hardware processors can be further operable to determine a type of recipient, access a server to obtain customization information associated with the type of the recipient, and combine the vCard with the vCard customization information associated with the type of the recipient to define a customized vCard. The server can be remotely located with respect to the user's mobile device.

The vCard customization information associated with the type of the recipient can include promotional material. For example, the vCard customization information associated with the type of the recipient can include promotional material for a product for which the recipient has indicated an interest.

According to an embodiment, a system can comprise one or more memories storing account information for a plurality of users. The account information can include customization information, e.g., vCard customization information for at least some of the users. One or more hardware processors can be operable to receive a communication including an indication of a desire of a user to communicate a customized electronic card, e.g., a customized vCard to a recipient, access the vCard customization information for the user, and send a communication including the vCard customization information to the user. The one or more memories can further store a vCard. The one or more hardware processors can be further operative to combine the vCard with the vCard customization information to define a customized vCard.

The vCard customization information can comprise any desired information. For example, the vCard customization information can comprise a schedule of the user, a product recommendation of the user, a restaurant recommendation of the user, and/or information regarding an event which the user intends to attend. The customization information can be used to schedule an appointment, purchase a product, or for any other desired reason.

According to an embodiment, a method can comprise storing, in one or more memories, vCard customization information. The vCard customization information can be accessed, electronically by one or more hardware processors. The customization information can be combined, electronically by one or more hardware processors with a vCard to define a customized vCard.

At least one of the one or more memories and at least one of the one or more hardware processors can be part of a mobile device. At least one of the one or more memories and at least one of the one or more hardware processors can be part of a server. The server can be an online seller server such as that of eBay, a payment provider server such as that of PayPal, Inc, a dedicated vCard server, or any other type of server.

According to an embodiment, a computer program product can comprise a non-transitory computer readable medium having computer readable and executable code for instructing one or more hardware processors to perform a method. The method can comprise storing vCard customization information, accessing the vCard customization information, and combining the customization information with a vCard to define a customized vCard.

A previously given customized vCard can be updated automatically. Such updating can occur using near field communications when the user and the recipient are near one another. Such updating can occur using a network when the user and the recipient are not near one another. Such updating can occur in response to a change in the user's vCard customization information that has an impact of the vCard previously given to the recipient. Such updating can occur in response to a change in the recipient's information, such as that information available via a social network, online seller, payment provider or the like, that has an impact of the vCard previously given to the recipient. Thus, a previously given customized vCard can be substantially maintained in a current or update status.

When two people meet, a vCard app can show how the two people are related to one another. This can be done even if the two people have never met before. For example, the vCard app can contain or access sufficient information to determine the nature of the relationship. The information can be in a database of one or both of their user devices, a server, or can be on the Internet, for example. The relationship can be regarding a common friend, a common interest, a common company where they both worked earlier or where they both work presently, or can be regarding any other thing that the two people have in common.

If the two people have met earlier, the vCard app and/or the vCard can show details regarding their prior meeting. For example, the vCard app and/or the vCard can show when and where the two people met, as well as what they did and/or discussed, if this information is available.

Such a vCard or vCard app can have various applications. For example, vCards and/or vCard apps can help human resources personal to find suitable candidates for jobs by accepting vCards from people whose profile (such as per their vCard) provides a potential match to requirements for a particular job. For example, a human resources person can go to a conference and can find prospective job candidates who meet the particular job requirements by exchanging vCards with attendees.

FIG. 1 is a block diagram of a system for providing customized vCards, according to an embodiment. The system can include a merchant device 110. The merchant device 110 can be a merchant checkout terminal, a computer, and/or a server, for example. The merchant device 110 can include a memory 111 and a hardware processor 112.

The merchant device 110 can provide information to be communicated as part of a customized vCard. For example, the merchant device 10 can provide advertisements, discounts, or promotional material that the user desires to communication to the recipient. The merchant device 110 can provide information regarding the user and/or the recipient and the information can be used to customize the vCard. For example, the merchant device 110 can provide information regarding purchases of the recipient that can be used to customize the vCard. As a further example, the merchant device 110 can be a device of a restaurant and the merchant device 110 can provide information regarding a dinner invitation of the user to the recipient, wherein the information include a menu of the restaurant.

The system can include a user's mobile device 120. The user's mobile device 120 can be carried by the user. The user's mobile device 120 can be a cellular telephone, a smart telephone, a hand held computer, a laptop computer, a notebook computer, or a tablet computer, for example. The user's mobile device 120 can include a hardware processor 121, a memory 122, and a global positioning system (GPS) 123. The user's mobile device 120 can be used for defining the customized vCard and for communicating the customized vCard to the recipient. The GPS 123 can be used to inform the recipient of the user's location. The user's location can be part of the vCard and can be updated periodically, as predefined by the user.

An app 124 can be stored in the memory 122 and executed by the hardware processor 121. The app 124 can be used for defining the customized vCard and for communicating the customized vCard to the recipient. The app 124 can be dedicated for use in defining the customized vCard and communicating the customized vCard to the recipient or the app 124 can be part of another, e.g., related, app. The app 124 can be an NFC app, can be associated with an NFC app, or can include NFC capability, for example.

The customized vCard system can include a plurality of other or recipients' mobile devices 130. The recipients' mobile devices 130 can be cellular telephones, smart telephones, hand held computers, laptop computers, notebook computers, or tablet computers, for example. Each of the recipients' mobile devices 130 can similarly include a hardware processor 131, a memory 132, and a global positioning system (GPS) 133. The other mobile devices 130 can be used for receiving the customized vCard and/or for collocating information contained on the customized vCard, as discussed herein. The GPS 133 of the recipients' mobile devices can inform the user of the recipient's location, such as when a recipient of a vCard is near the user.

An app 134 can be stored in the memory 132 and can be executed by the hardware processor 131. The app 134 can be a standard, contemporary NFC app. The app 134 can be used for receiving the customized vCard and/or for correlating information contained on the customized vCard to determine common interests and the like, as discussed herein.

The social mobile shopping system can include a server 160. The server 160 can be a server of a payment provider, such as PayPal, Inc. The server 160 can be a server of an online seller, such as eBay. The server 160 can be a single server or can be a plurality of servers. The server 160 can include one or more hardware processors 161 and a memory 162. The memory 162 can be a memory of the server 160 or a memory that is associated with the server 160. The memory 162 can be a distributed memory. The memory 162 can store a user account 163 and a merchant account 164. The server 160 can be used for to store information, parameters, and algorithms for practicing the method and system for customizing vCards, as discussed herein. The user's account 163 can contain information regarding the user that can be used to customize vCards, For example, the user's account 163 can contain information regarding purchases made by the user that are indicative of interests of the user and that can be matched to similar information of the recipient to provide an indication of a common interest therebetween.

The merchant device 110, the mobile device 120, the other mobile devices, and the server 160 can communicate with one another via a network, such as the Internet 140. The merchant device 110, the mobile device 120, the other mobile devices, and the server 160 can communicate with one another via one or more networks, such as local area networks (LANs), wide area networks (WANs), cellular telephone networks, and the like. The merchant device 110, the mobile device 120, the other mobile devices, the social network 150, and the server 160 can communicate with one another, at least partially, via one or more near field communications (NFC) methods or other short range communications methods, such as infrared (IR), Bluetooth, WiFi, and WiMax, FIG. 1 illustrates an exemplary embodiment of a network-based system for implementing one or more processes described herein. As shown, the network-based system may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or another suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Figure 2:
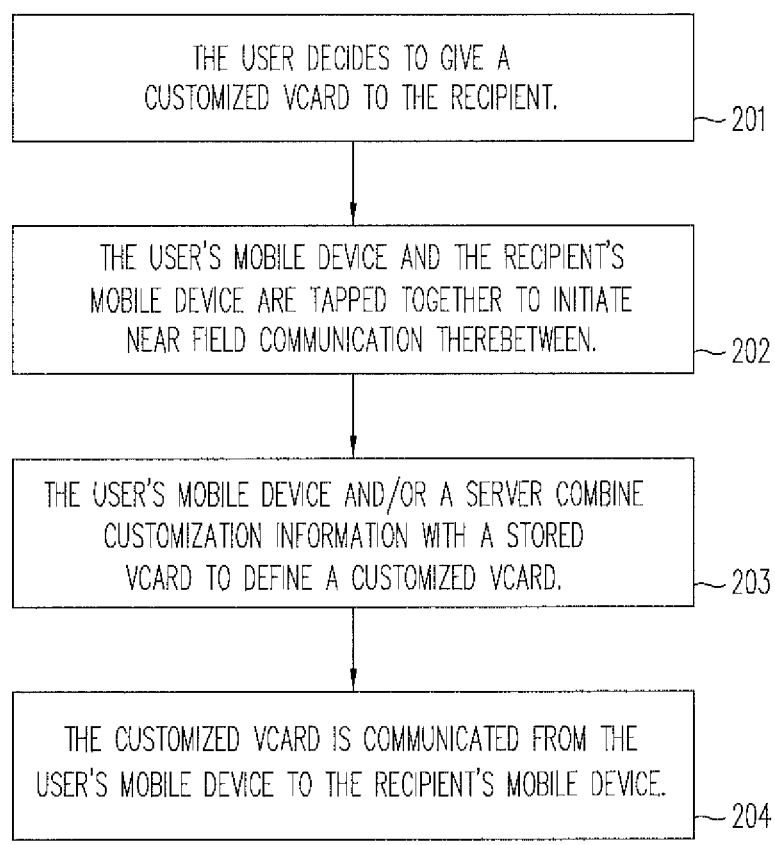
FIG. 2 is a flow chart showing a method for providing customized vCards, according to an embodiment.
Figure 3:
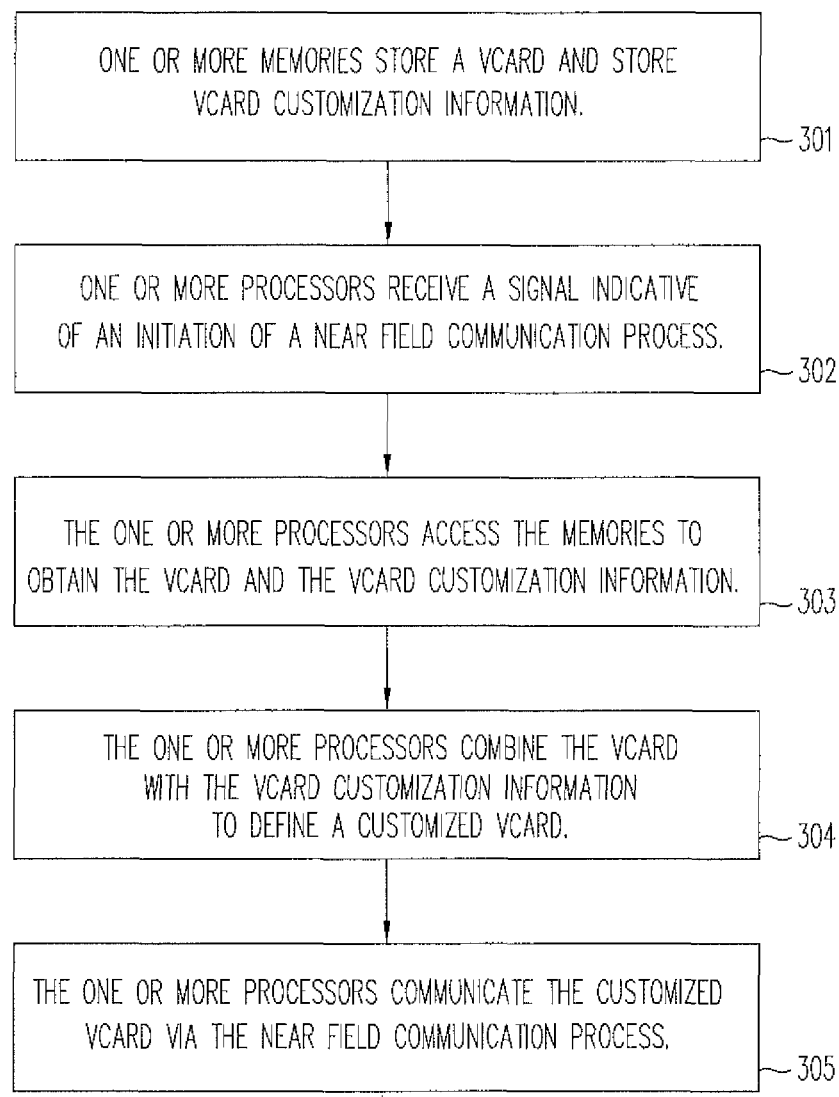
FIG. 3 is a flow chart showing further detail of the method for providing customized vCards, according to an embodiment.

FIGS. 2 and 3 are flow charts that describe examples of operation of the system for providing customized vCards according to embodiments thereof. Note that one or more of the steps described herein may be combined, omitted, or performed in a different order, as desired or appropriate.

FIG. 2 is a flow chart showing a method for providing customized vCards, according to an embodiment. The user can decide to give a vCard to the recipient, as shown in step 201. The recipient can be anyone to whom the user would like to give the vCard. The vCard can be a customized vCard or a non-customized vCard. The user can decide to give a vCard to multiple recipients, such as selected members of a group.

The user's mobile device 120 and the recipient's mobile device 130 can be brought close to one another, tapped together, or otherwise caused to initiate near field communication therebetween, as shown in step 202. Thus, the vCard can be communicated from the user's mobile device 120 to the recipient's mobile device 130 via near field communication. Alternatively, the vCard can be communicated from the user's mobile device 120 to the recipient's mobile device 130 via the network 140.

The user's mobile device 120 and/or the server 160 can combine customization information with a stored vCard to define a customized vCard, as shown in step 203. The customized vCard can communicated from the user's mobile device to the recipient's mobile device, as shown in step 204. Alternatively, the customization information and the stored vCard can be combined in the recipient's mobile device 130, such as via the app 134.

FIG. 3 is a flow chart showing further detail of the method for providing customized vCards, according to an embodiment. One or more memories can store a vCard and can store vCard customization information, as shown in step 301. The memories can be associated with the user's mobile device 120, the recipient's mobile device 130, the server 160, the social network 150, or any other device or system.

One or more hardware processors can receive a signal indicative of an initiation of a near field communication process, as shown in step 302. The hardware processors can be associated with the user's mobile device 120, the recipient's mobile device 130, the server 160, the social network 150, or any other device or system. The one or more hardware processors access the memories to obtain the vCard and the vCard customization information, as shown in step 303.

The one or more hardware processors combine the vCard with the vCard customization information to define a customized vCard, as shown in step 304. The one or more hardware processors communicate the customized vCard via the near field communication process, as shown in step 305.

According to an embodiment, the user can designate what information is to be communicated to the recipient in real time, e.g., immediately prior to the communication. For example, the app 124 can present the user with a list of information that is to potentially be sent to the recipient as part of the vCard and the user can select which items from the list are to be included with (or omitted from) the vCard. The user can designate what is to be communicated in advance of the communication, e.g., during a set up procedure that can be performed any time prior to the communication.

A vCard can be customized in real time, e.g., immediately prior to the communication. A vCard can be customized in advance of communication, e.g., during a set up procedure that can be performed any time prior to the communication.

A vCard can comprise one file or multiple files. The files can be of any desired type. For example, the files can be text files, audio files, video files, or any other type or combination of types of files. The vCard can thus contain a video presentation of the user. The vCard can contain audio information and the recipient can listen to the audio information to obtain instructions to the user's place of business for a business meeting, to a restaurant for a dinner meeting, or to a store to purchase a product, for example. The directions can be from the recipient's present location, as provided by the GPS 133 of recipient's mobile device 130.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or hardware processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Payment processing can be through known methods, such as transaction details being communicated to the payment provider through the app, the payment provider processing the details, which may include user account and identifier information and authentication, merchant information, and transaction details. The user account may be accessed to determine if any restrictions or limitations may prevent the transaction from being approved. If approved, the payment provider may send a notification to the merchant and/or the user.

Figure 4:
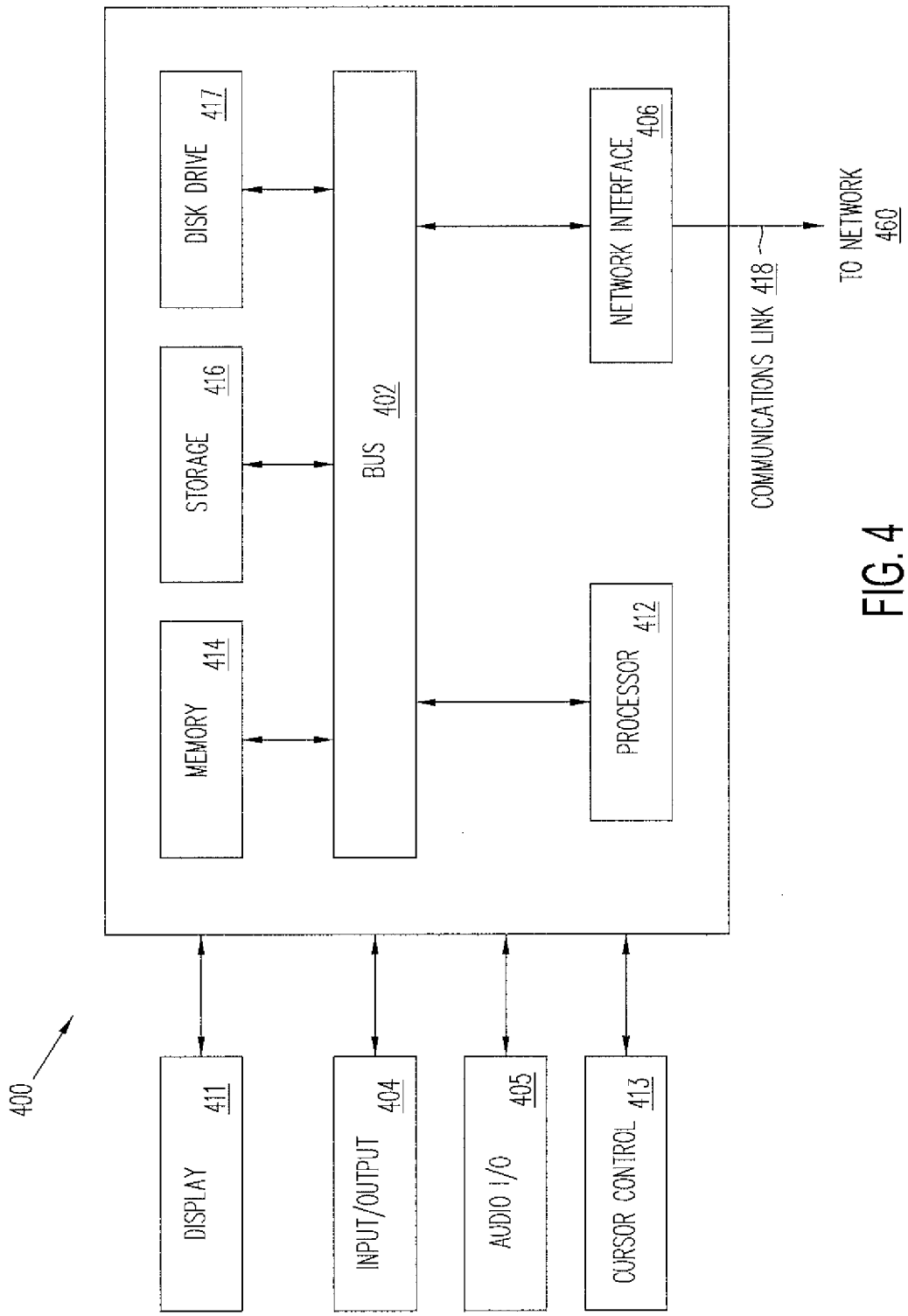
FIG. 4 is a block diagram of an example of a computer that is suitable for use in the system for providing customized vCards, according to an embodiment.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to hardware processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more hardware processors to execute or process the steps described herein.

A computer system may transmit and receive messages, data, information and instructions, including one or more programs (i.e., application code) through a communication link and a communication interface. Received program code may be executed by a hardware processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used herein, the term "store" can include any business or place of business. The store can be a brick and mortar store or an online store. The store can be any person or entity that sells a product.

As used herein, the term "product" can include any item or service. Thus, the term "product" can refer to physical products, digital goods, services, or anything for which a user can make a payment, including charitable donations. A product can be anything that can be sold. Examples of products include cellular telephones, concerts, meals, automotive repair, haircuts, digital music, and books.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "network" can include one or more local area networks (LANs) such as business networks, one or more wide area networks (WANs) such as the Internet, one or more cellular telephone networks, or any other type or combination of electronic or optical networks.

As used herein, the terms "near field communication" and "NFC" can include any type of wireless communications wherein two mobile device such as cellular telephones or portable computing devices communicate wirelessly and directly with one another.

As used herein, the term "portable computational device" can include any type of portable computer. For example, a portable computational device can be a laptop computer, a notebook computer, a tablet computer, a smart cellular telephone, or the like.

As used herein, a vCard can be any electronic card. No specific format or protocol is required. The vCard can contain any desired information. For example, the vCard can be substantially analogous to a paper (card stock), contemporary business card. The vCard can have the specific format and protocol of a contemporary vCard or can have any other format and/or protocol.

As discussed herein, a user can customize information that is to be communicated from the user's mobile device to the mobile devices of one or more recipients. The information can be in the form of a virtual business card or vCard. The recipient(s) of the information can create or update information, such as contact information, scheduling information, and the like. Any shared interests, connections, likes, dislikes, etc. can be determined, such as via an app, and can be communicated to the user and/or the recipient. The information can be exchange automatically based upon any desired criteria. For example, the information can be provided to recipients based upon their names, membership in specified groups, proximity, time, date, type of mobile device, identification of mobile device, or any other criteria. The information can be exchanged by NFC, network communications, or any other means.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   receiving, via an electronic communication network from a user device of a user, a signal indicative of an initiation of a near field communication (NFC) between the user device of the user and a recipient device of a recipient, the NFC initiated by a physical contact between the user device and the recipient device;
   in response to receiving the signal, determining a selectable list of electronic business card customization information based at least in part on data associated with the recipient device;
   communicating the selectable list of electronic business card customization information to the user device for selection by the user;
   receiving an indication of one or more selections from the list of electronic card customization information selected at the user device by the user;
   generating, based on the received indication of one or more selections, a customized electronic business card that includes card customizations corresponding to the received indication of one or more selections; and
   communicating, the customized electronic business card to the recipient device.

2. The system of claim 1, wherein:
   generating the customized electronic business card includes combining a standard electronic business card with the electronic business card customization information to define the customized electronic business card; and
   the electronic business card customization information is applicable to a plurality of people.

3. The system of claim 2, wherein the operations further comprise receiving the electronic business card customization content from the user.

4. The system of claim 2, wherein the operations further comprise receiving the electronic business card customization information from a social network.

5. The system of claim 2, wherein the operations further comprise:
   determining a type of the recipient;
   obtaining the electronic business card customization associated with the type of the recipient; and
   combining the standard electronic business card with the electronic business card customization information associated with the type of the recipient to define the customized electronic business card.

6. The system of claim 2, wherein the operations further comprise:
   determining a type of the recipient;
   accessing a server to obtain the electronic business card customization information associated with the type of the recipient; and
   combining the standard electronic business card with the electronic business card customization information associated with the type of the recipient to define the customized electronic business card.

7. The system of claim 2, wherein operations further comprise:
   determining a type of the recipient;
   accessing a server to obtain the electronic business card customization information associated with the type of the recipient;
   combining the standard electronic business card with the electronic business card customization information associated with the type of the recipient to define the customized electronic business card; and
   wherein the electronic business card customization information associated with the type of the recipient includes promotional material.

8. The system of claim 2, wherein the operations further comprise:
   determining a type of the recipient;
   accessing a server to the obtain electronic card customization information associated with the type of the recipient;
   combining the standard electronic business card with the electronic business card customization information associated with the type of the recipient to define a customized electronic business card; and
   wherein the electronic business card customization information associated with the type of the recipient includes promotional material for a product for which the recipient has indicated an interest.

9. The system of claim 1, wherein the customized electronic business card comprises information related to shared attributes of the user and the recipient.

10. The system of claim 1, wherein the customized electronic business card comprises information related to shared interests, hobbies, connections, likes, or dislikes of the user and the recipient.

11. The system of claim 1, wherein the customized electronic business card comprises information related to a relationship and a relationship history between the user and the recipient.

12. The system of claim 1, wherein the customized electronic business card is communicated to a mobile device of the recipient via near field communication.

13. The system of claim 1, wherein the customized electronic business card is communicated to a cellular telephone of the recipient.

14. A system comprising:
a non-transitory memory; and
one or more hardware processors coupled to the non-transitory memory and configured to read instructions from the non-transitory memory to cause the system to perform operations comprising:
receiving, via an electronic communication network from a user device of a user, a communication including an indication of a desire of the user to communicate a customized electronic business card to a recipient;
receiving, via the electronic communication network from the user device of the user, a signal indicative of an initiation of a near field communication (NFC) between the user device of the user and a recipient device of a recipient, the NFC initiated by a physical contact between the user device and the recipient device;
in response to receiving the signal, determining a selectable list of electronic business card customization information based at least in part on data associated with the recipient device;
communicating the selectable list of electronic business card customization information to the user device for selection by the user;
receiving an indication of one or more selections from the list of electronic card customization information selected at the user device by the user;
generating, based on the received indication of one or more selections, a customized electronic business card that includes card customizations corresponding to the received indication of one or more selections; and
sending, electronically via the electronic communication network, a communication including the customized electronic business card to the user device of the user.

15. The system of claim 14, wherein the electronic business card customization information comprises at least one item selected from the group comprising:
a schedule of the user;
a product recommendation of the user;
a restaurant recommendation of the user; and
information regarding an event which the user intends to attend.

16. A method comprising:
receiving, via an electronic communication network from a user device of a user, a signal indicative of an initiation of a near field communication (NFC) between the user device of the user and a recipient device of a recipient, the NFC initiated by a physical contact between the user device and the recipient device;
in response to receiving the signal, determining a selectable list of electronic business card customization information based at least in part on data associated with the recipient device;
communicating the selectable list of electronic business card customization information to the user device for selection by the user;
receiving an indication of one or more selections from the list of electronic card customization information selected at the user device by the user; and
generating based on the received indication of one or more selection, a customized electronic business card including that includes card customizations corresponding to the received indication of one or more selections.

17. The method of claim 16, wherein the user device is a mobile device configured for near field communication.

18. A nontransitory machine-readable medium having stored thereon machine-readable instructions to cause a machine to perform operations comprising:
receiving, via an electronic communication network from a user device of a user, a signal indicative of an initiation of a near field communication (NFC) between the user device of the user and a recipient device of a recipient, the NFC initiated by a physical contact between the user device and the recipient device;
in response to receiving the signal, determining a selectable list of electronic business card customization information based at least in part on data associated with the recipient device;
communicating the selectable digital list of electronic business card customization information to the user device for selection by the user;
receiving an indication of one or more selections from the list of electronic card customization information selected at the user device by the user; and
generating, based on the received indication of one or more selections, a customized electronic business card that includes card customizations corresponding to the received indication of one or more selections.

* * * * *